(12) United States Patent
Ishii

(10) Patent No.: US 7,720,467 B2
(45) Date of Patent: May 18, 2010

(54) USER NOTIFICATION FOR DIGITAL MOBILE PHONES

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 746 days.

(21) Appl. No.: 10/738,487

(22) Filed: Dec. 17, 2003

(65) Prior Publication Data

US 2005/0136966 A1    Jun. 23, 2005

(51) Int. Cl.
*H04M 11/00* (2006.01)
(52) U.S. Cl. .................... 455/421; 455/419; 455/452.2; 455/567
(58) Field of Classification Search ............... 455/550.1, 455/566, 567, 569.2, 574, 99, 404.2, 456.1, 455/457, 414.2, 414.4, 421, 423, 456.2, 456.3, 455/404.1, 412.2, 67.7; 701/2, 36, 200
See application file for complete search history.

(56) References Cited

U.S. PATENT DOCUMENTS

| | | | |
|---|---|---|---|
| 5,842,146 A * | 11/1998 | Shishido | 701/210 |
| 6,167,289 A * | 12/2000 | Ball et al. | 455/572 |
| 6,219,540 B1 * | 4/2001 | Besharat et al. | 455/421 |
| 6,246,888 B1 * | 6/2001 | Tsuchiyama | 455/566 |
| 6,282,431 B1 | 8/2001 | Konno | |
| 6,373,229 B1 * | 4/2002 | Slusky | 340/636.2 |
| 6,771,990 B1 * | 8/2004 | Nilsson | 455/566 |
| 2002/0098857 A1 | 7/2002 | Ishii | |
| 2002/0116658 A1 | 8/2002 | Yano | |
| 2004/0022131 A1 * | 2/2004 | Kibiloski et al. | 368/47 |
| 2004/0203951 A1 * | 10/2004 | Mazzara et al. | 455/466 |
| 2004/0242283 A1 * | 12/2004 | Flores | 455/566 |
| 2005/0113089 A1 * | 5/2005 | Bamburak et al. | 455/435.2 |
| 2005/0148303 A1 * | 7/2005 | Dempsey | 455/69 |

FOREIGN PATENT DOCUMENTS

| | | |
|---|---|---|
| WO | WO 9814842 | 4/1998 |
| WO | WO 0052847 | 9/2000 |
| WO | WO 0079349 | 12/2000 |

* cited by examiner

*Primary Examiner*—Duc M. Nguyen
*Assistant Examiner*—Dai Phuong
(74) *Attorney, Agent, or Firm*—David C. Ripma

(57) ABSTRACT

A method of notifying a user to set an internal clock in a mobile communication device having a visual display therein includes powering-up the mobile communication device; determining whether digital services are available, and, if not, activating notification indicia to tell the user to manually set the internal clock in the mobile communication device.

16 Claims, 1 Drawing Sheet

USER NOTIFICATION FOR DIGITAL MOBILE PHONES

FIELD OF THE INVENTION

This invention relates to clocks in mobile communication devices, and specifically to a mechanism for prompting a user of a digital communication device to set the current time manually, when the phone's clock does not maintain valid time while an application, such as alarm clock, is waiting for clock events.

BACKGROUND OF THE INVENTION

Today, almost all mobile phones are equipped with a clock, including PDA's and other mobile communication devices, which also maintain calendaring, and, in some instances, EMail and browser functions. In some digital cellular/PCS systems, such as the IS-95/2000 CDMA system, the clock in a phone is synchronized to the precise local time (Coordinated Universal Time (UTC)+time zone) given by the base station to which the phone is currently communicating with. Once synchronized, the mobile station maintains the clock until the phone is turned off. As a result, users of such phones do not have to adjust the phone clocks while they are in a digital service coverage area.

However, if the mobile phone is powered up outside of a digital service coverage area, the mobile station may lose the current time, unless it is equipped with a battery-back-up real-time clock hardware (RTC). The RTC maintains the clock while the mobile phone is turned off, but requires extra physical space within the phone and increases the manufacturing costs. For a mobile phone without an RTC, applications that rely on the clock will not function when the current time is lost. For example, in such a case the "alarm clock" feature will miss the time at which it is supposed to give a visual/audible alert to the user.

In addition, because a RTC is normally driven by a low-cost crystal oscillator with only marginal accuracy, the mobile phone may not have a sufficiently accurate clock even if it is equipped with an RTC.

Some mobile phones provide the capability for users to set the current time manually. However, a user may not be aware of the need to set the phone clock manually, or may forget to set the time manually, and thereby not receive important clock-dependent information, or receive the information at an inappropriate time.

U.S. Patent Publication No. 20020116658 A1, of Yano, Published Aug. 22, 2002, for Terminal device and real-time clock control method therefor enabling preservation of clock/calendar information and high information readout speed, describes a method for clock/calendar information to be maintained reliably and correctly through the use of dual RTCs.

U.S. Pat. No. 6,282,431, to Konno, granted Aug. 28, 2001, for Time correcting method and portable remote telephone terminal in which time is corrected in accordance with such method, describes a time correcting method by receiving notifying information from a base station.

U.S. Patent Publication No. 20020098857 A1, of Ishii, published Jul. 25, 2002, for Clock for mobile phones, describes a method of managing time zone changes for mobile devices.

WO0079349, of Ostsjo et al., for Method and Apparatus for Real Time Clock Frequency Error Correction, published Dec. 28, 2000, describes a method of calibrating/correcting a phone's RTC.

WO0052847, of Persico, for Radiotelephone Timer, published Sep. 8, 2000, describes a programmable timer using a RTC, for setting unitary or repeatable clock events.

WO9814842, of LaSalle, for Synchronization of a Timepiece to a Reference Time, published Apr. 9, 1998, describes a method and apparatus for synchronizing a timepiece to a reference time, particularly when changing between daylight and standard time.

SUMMARY OF THE INVENTION

A method of notifying a user to set an internal clock in a mobile communication device having a visual display therein includes powering-up the mobile communication device; determining whether digital services are available, and, if not, activating notification indicia to tell the user to manually set the internal clock in the mobile communication device.

It is an object of the invention to provide a prompt mechanism to remind a mobile phone user manually to set a valid time.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
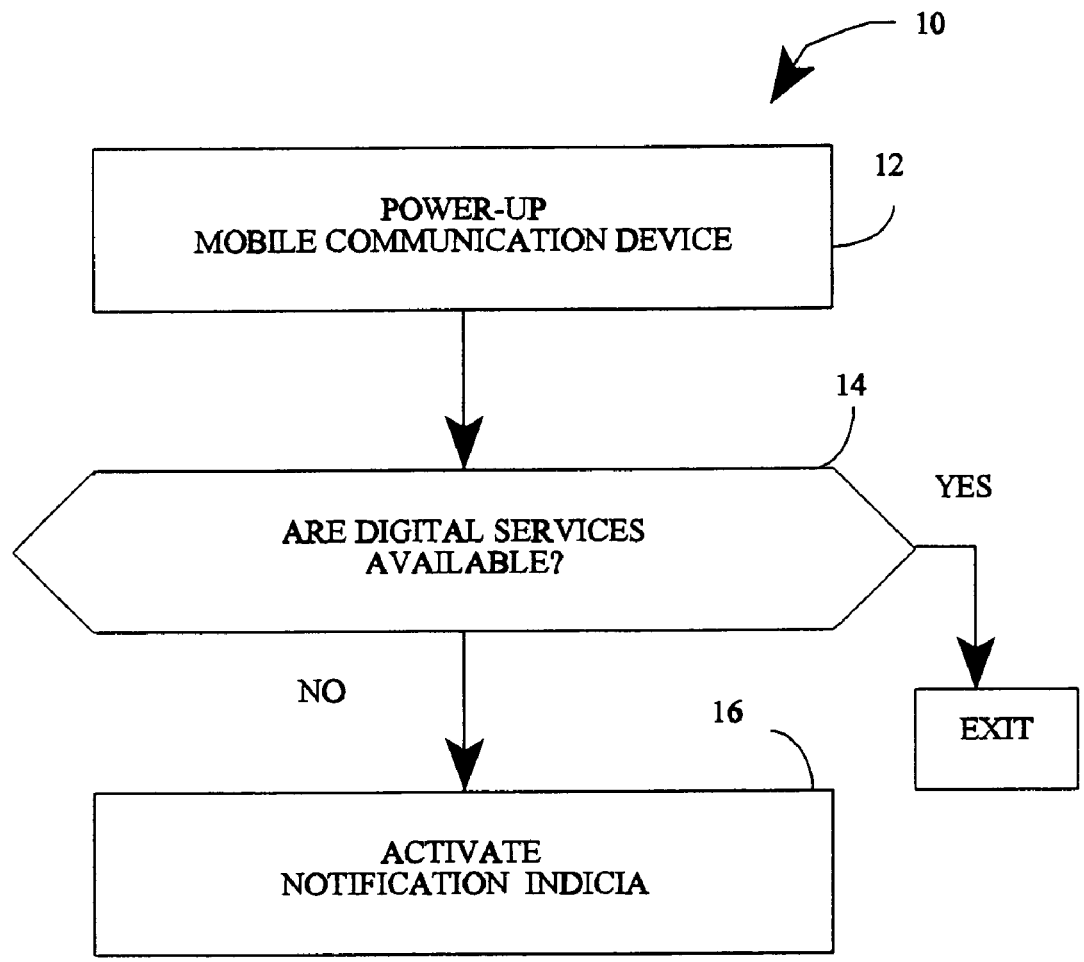
FIG. 1 is a block diagram of the method of the invention.

This invention provides a means to prompt a user of a digital cellular phone, or other clock-equipped mobile communication device, to set the current time manually, when the phone's clock does not maintain valid time while an application, such as an alarm clock, is waiting for the occurrence of a clock event. Digital cellular phones automatically obtain correct time by communicating with base stations, but many such phones have no means of maintaining the correct clock time when the phone is turned off.

One of the preferred embodiments of this invention, and now referring to FIG. 1, wherein the preferred embodiment is depicted generally at 10, displays notification indicia to indicate the occurrence of a clock event. Initially, the phone is powered-up, block 12, and determines whether digital service is available or not, block 14. If digital service is not detected, an activation mechanism of the phone activates its notification indicia, block 16. Notification indicia may take any of several forms, e.g., a flashing icon on the phone's visual display, an audible tone, or a vibratory alert. For example, if the user has previously activated the alarm clock, and if the phone has not discovered digital services since the last power-cycle (lost time), it displays a flashing icon on its visual display. The icon keeps flashing until (1) the phone connects with digital services, or (2) the user sets time manually. The notification indicia may be activated with a pre-determined frequency and/or duration while the icon is flashing. The method of the invention may include a mechanism for detecting whether a clock event has been set, and, if no clock event is set, the notification activation mechanism may be disabled. Thus, the user is prompted to manually set time, resulting in the application being more likely to function properly.

In the event that a clock event is set, and the phone loses contact with digital service, the method of the invention and the activation mechanism provides that the notification indicia will be activated after a pre-determined amount of time passes without contact with a digital service to ensure that the internal clock of the phone will maintain a relatively precise time.

In addition to the embodiment described above, this invention provides a user the option as to whether the visual/audible indicia is defaulted to enabled or disabled.

Thus, a user notification for digital mobile phones has been disclosed. It will be appreciated that further variations thereof may be made within the scope of the invention as defined in the appended claims.

I claim:

1. A method of notifying a user to set an internal clock in a digital mobile phone having a visual display therein, wherein the digital mobile phone does not contain battery-back-up real-time clock hardware and has no means of maintaining the correct clock time when the digital mobile phone is turned off, and wherein the digital mobile phone is operable, when the digital mobile phone is turned on and upon receipt by the digital mobile phone of a signal from a digital phone service, to set the internal clock in the digital mobile phone, the digital mobile phone including an alarm clock application which can be set to await the occurrence of a clock event, the method comprising:

powering-up the digital mobile phone from an internal power supply;

determining whether digital phone services are available for the digital mobile phone, detecting whether a the alarm dock has been set to await the occurrence of a clock event and, if digital phone services are not available and the alarm clock has been set to await the occurrence of a clock event, activating notification indicia to tell the user to manually set the internal clock in the digital mobile phone, whereby the alarm clock will function properly.

2. The method of claim 1 wherein said activating notification indicia includes a visible indicia displayed on the digital mobile phone visual display.

3. The method of claim 1 wherein said activating notification includes an audible indicia.

4. The method of claim 1 wherein said activating notification indicia includes a vibratory alert.

5. The method of claim 1 wherein said activating notification indicia includes activating such indicia until the user sets the internal clock time manually.

6. The method of claim 1 wherein said activating notification indicia includes activating such indicia until the digital mobile phone connects to digital phone service.

7. A method of notifying a user to set an internal clock in a digital mobile phone having a visual display therein, wherein the digital mobile phone automatically obtains the correct time by communicating with base stations when digital services are available and does not contain battery-back-up real-time clock hardware to maintain valid time after a pre-determined amount of time passes without contact with digital phone services, the digital mobile phone including an alarm clock application which can be set to await the occurrence of a clock event, the method comprising:

determining whether digital phone services are available for the digital mobile phone, wherein the digital mobile phone is operable, upon receipt by the digital mobile phone of a signal from a digital phone service, to set the internal clock in the digital mobile phone, detecting whether the alarm dock has been set to await the occurrence of a clock event, and activating notification indicia to tell the user to manually set the internal clock in the digital mobile phone only if digital phone services are not available for pre-determined amount of time and the alarm clock has been set to await the occurrence of a clock event, wherein said activating notification indicia includes activating such indicia until the user sets the internal clock time manually, or until the digital mobile phone connects to digital phone service.

8. The method of claim 7 wherein said activating notification indicia includes a visible indicia displayed on the digital mobile phone visual display.

9. The method of claim 7 wherein said activating notification includes an audible indicia.

10. The method of claim 7 wherein said activating notification indicia includes a vibratory alert.

11. A method of notifying a user to set an internal clock in a digital mobile phone having a visual display therein, wherein the digital mobile phone includes an alarm clock application which can be set to await the occurrence of a clock event and does not contain battery-back-up real-time clock hardware, the method comprising:

powering-up the digital mobile phone from an internal power supply;

determining whether digital phone services are available for the digital mobile phone, wherein the digital mobile phone is operable, upon receipt by the digital mobile phone of a signal from a digital phone service, to set the internal clock in the digital mobile phone, detecting whether a the alarm clock has been set to await the occurrence of a clock event and, if digital phone services are not available to set the internal clock in the digital mobile phone, and the alarm clock has been set to await the occurrence of a clock event, activating notification indicia to tell the user to manually set the internal clock in the digital mobile phone.

12. The method of claim 11 wherein said activating notification indicia includes a visible indicia displayed on the digital mobile phone visual display.

13. The method of claim 11 wherein said activating notification includes an audible indicia.

14. The method of claim 11 wherein said activating notification indicia includes a vibratory alert.

15. The method of claim 11, wherein said activating notification indicia includes activating such indicia until the user sets the internal dock time manually.

16. The method of claim 11 wherein said activating notification indicia includes activating such indicia until the digital mobile phone connects to digital phone service.

* * * * *